UNITED STATES PATENT OFFICE.

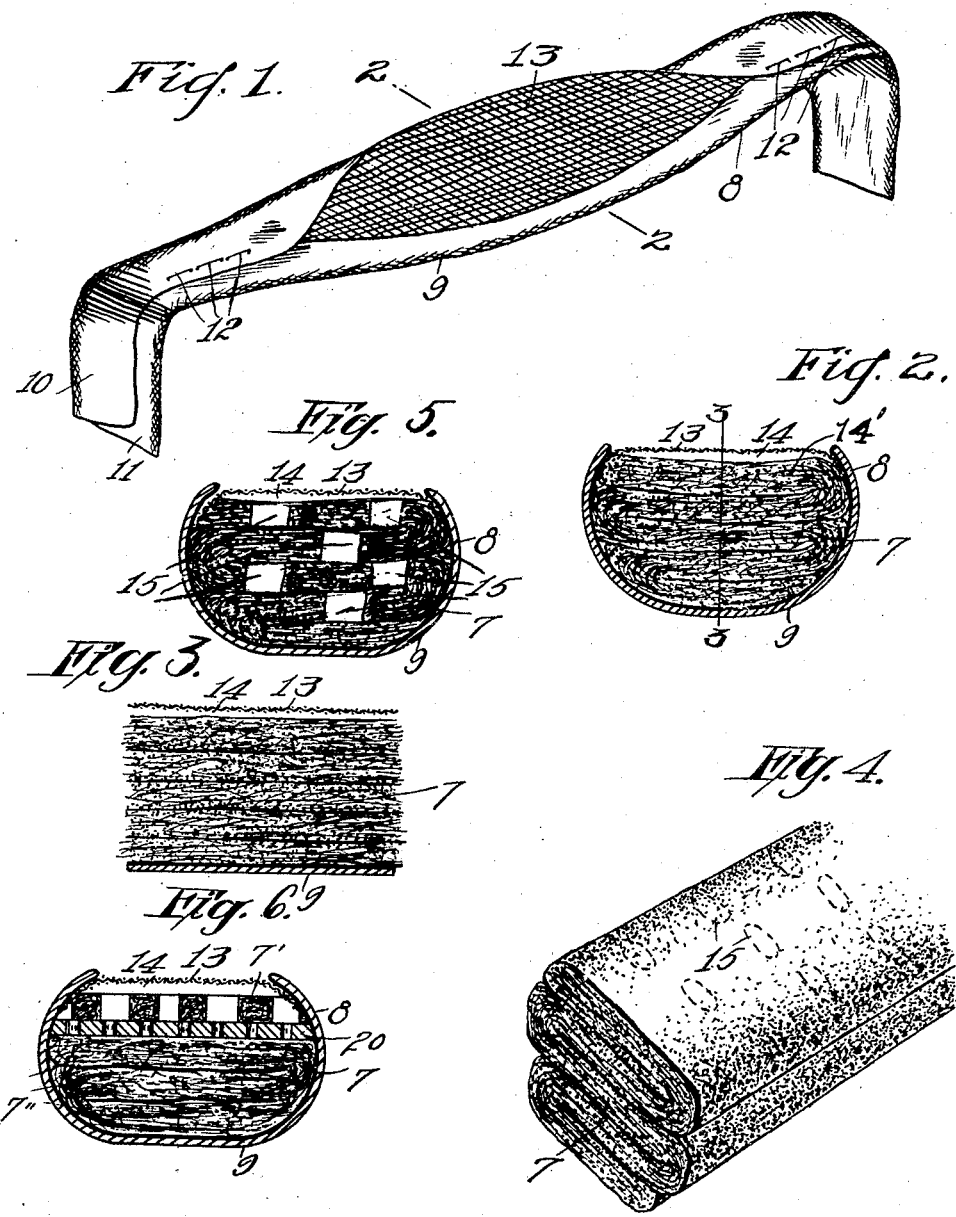

WILLARD R. GREEN, OF MUSCATINE, IOWA, ASSIGNOR TO THE AMERICAN ABSORBENT FIBER COMPANY, OF PORTLAND, MAINE, A CORPORATION OF MAINE.

ABSORBENT BANDAGE.

No. 810,134.     Specification of Letters Patent.     Patented Jan. 16, 1906.

Application filed June 13, 1904. Serial No. 212,279.

*To all whom it may concern:*

Be it known that I, WILLARD R. GREEN, a citizen of the United States, residing in Muscatine, in the county of Muscatine and State of Iowa, have invented certain new and useful Improvements in Absorbent Bandages, of which the following is a specification.

This invention relates to the class of manufacture known as "absorbent bandages," and has for an object to provide an efficient and economical bandage of this class.

In the drawings accompanying and forming a part of this specification, Figure 1 illustrates in perspective view a form of bandage embodying the present improvements. Fig. 2 is a cross-sectional view thereof upon the line 2 2 of Fig. 1. Fig. 3 is a portion of a longitudinal section upon the line 3 3 of Fig. 2. Fig. 4 is a perspective of a portion of the absorbent member. Fig. 5 is a cross-sectional view illustrating the absorptive member provided with a number of cell or chamber spaces, and Fig. 6 is a cross-section of a bandage embodying the present improvements and provided with a side-bracing member.

In accordance with my present improvements the mass of absorptive material is made up of a plurality of superimposed layers, and in the preferred form of the bandage these layers consist of successive folds of material in sheet form, the folds extending longitudinally of the bandage and the edges of the folds lying along the outer surface of the absorbent mass.

The absorptive mass (designated in a general way by 7) and in practice the absorbent material for the layer or layers of the absorbent mass may be formed of a single kind of absorbent, such as vegetable fiber—as, for instance, cotton or linen; but I prefer to employ a combination of materials—such for instance, as a relatively small quantity of cotton suitably mingled or incorporated with a somewhat larger quantity of wood in the form of small thin strands. This kind of absorptive material has the advantage of possessing a relatively high degree of firmness and stability even after absorbing relatively large amounts of fluid.

The absorptive mass is shown supported and partially surrounded by a suitable cover-sheet 8, which may be made of some suitable closely-woven material and waterproofed upon the inside, as at 9. Such cover-sheet may have the sides 10 and 11 at its ends lapped one over the other and secured by suitable fastenings or stitches, (designated in a general way by 12,) which loose ends may afford suitable means for securement to some device for holding the bandage in place. It will be observed that the ends of such securing members are free from fastening devices, which will lend the same more readily to the use of buckles or the like than would an end having fasteners extending over their entire length. Also economy in time and material is had by the application of the fastening means to a comparatively short length of the materials fastened. The cover-sheet embraces the sides of the absorptive mass and has an opening at the portion which may be designated the "top" thereof and which opening is covered in the present instance by a suitable cover-sheet 13, which cover-sheet, however, in certain instances may advantageously be dispensed with. It will also be noticed that the cover-sheet is so disposed relatively to the top surface of the mass of absorptive material that a chamber-space 14 remains between such cover-sheet and the upper surface of the absorptive mass. The absorptive mass is made up of several superimposed layers fo absorbent material. These may be cut to size, if desired, or, as illustrated, may be formed by folding the mass in a direction longitudinally thereof, whereby the folds are at the sides of the bandage and running longitudinally of the same.

By reference to Fig. 2 it will be seen that the upper surface 14' of the upper layer of the absorbent has a curved or concave shape, and assuming that the cover-sheet 13 is drawn tightly between the absorptive mass and the cover-sheet the space 14 will be maintained by the tendency of the top layer to straighten and to stretch the cover-sheet, which by resisting will hold the said top layer bowed, and even assuming that in some instances this antagonism of forces will be neutralized upon the saturation of the cover-sheet and the absorptive mass, yet prior to such time of yielding the chamber-space will have done its work, one feature of which is the ability to quickly receive a relatively large quantity of matter for absorption, and after such "flood" of matter has been properly distributed it is in many cases immaterial whether or not the cover-sheet is held off of the absorptive mass.

A further feature of the present improvement relates to the perforation of one or more of the layers, whereby the absorbent material in one layer has openings therein for permitting direct passage of fluids downwardly to the absorbent layers below the said layer, also the provision of cell-spaces or chamber-spaces within the body of the absorbent mass, which has the advantage of modifying and in some cases accelerating the distribution and final absorption of the fluids or semi-fluids. This feature is illustrated in Fig. 5 and designated in dotted lines in Fig. 4. It will be seen that the several layers are provided with openings or recesses 15, constituting cell-spaces or an amount of chamber-space within the bandage, thus assisting in the distribution and retention of the materials delivered to the bandage and also reducing the amount of fiber-stock contained within a bandage of a given size. Assuming that the top layer will have a considerable number of these open cell-spaces it will be apparent that the material received will find access to such spaces, from which it will be distributed throughout the entire mass.

In Fig. 6 a side-bracing member 20 is shown located between two of the absorbent layers, in the present instance being shown between the first and second layer of the mass 7. This side-bracing member is or may be in the form of a perforated plate. When this side-bracing member is perforated, and especially when it is employed in connection with an absorbent-receiving layer having openings therein, as indicated, for instance, in Fig. 6, said side-bracing member also constitutes a distributing means by which the fluids will normally be directed laterally of the mass below the upper surface thereof, and thus more rapidly and effectively be disposed of by absorption into the lower portions of the absorbent mass throughout the entire area of the cells.

In practice the layers may be separately formed of suitable widths and superimposed one upon the other to the required depth. Also the surface layer or receiving member 7' may be of a finer and more flexible quality, while the layers 7'' below said receiving member may be of a relatively coarser character. (See Fig. 6.)

In the manufacture of the stock for the absorptive mass the same may be made up into a mass comprising in its major portion woody strands in the form of excelsior mingled together with a minor portion of cotton fiber, and in the organization of the mass as a whole the respective portions of the bandage may be made up of stock of various qualities, whereby one portion will be of coarser stock than the other portion.

I do not herein claim broadly the commingling of woody strands or excelsior and fiber, as this is claimed in my copending allowed application, Serial No. 217,969, filed July 25, 1904, nor broadly a cellular structure, as this is claimed in my copending application, Serial No. 212,276, filed June 13, 1904, nor broadly a bracing member, as this is claimed in my copending application, Serial No. 211,926, filed June 10, 1904.

Having thus described my invention, I claim—

1. A bandage comprising a supporting cover-sheet, a body of absorbent material therein, and a perforated receiving layer, made up of an absorptive mass of material, upon said body.

2. In a bandage, the combination with a cover-sheet, of a mass of absorptive material therein arranged in the form of folded layers, the lines of the folds running longitudinally of the bandage, and the layers being some of them perforated to produce a number of disconnected chamber-spaces located at various points within the said mass.

3. A bandage comprising a cover-sheet, an absorptive body within said sheet comprised of mingled woody strands and vegetable fiber, and so organized that the major portion of such mass will be composed of coarse stock and the upper or receiving layer or portion of a finer grade of stock.

4. In a bandage, the combination with means for supporting the mass, of a mass of fibrous absorbent material supported thereby and arranged in layers, the upper layer whereof is of a finer stock than the other layers, and some of which layers are provided with perforations making cell-spaces, and a side bracing member comparatively unyielding transversely of the bandage and imposed between some of said layers and provided with openings.

5. An absorbent material for a bandage, arranged in the form of layers, each made up of a mass of absorptive stock, one or more of such layers having perforations to form a number of chambers or cell-spaces located at various points within the mass.

6. In a bandage, the combination with a cover-sheet having an opening, of an absorptive mass, composed of vegetable fiber and woody strands within said cover-sheet and comprising a perforated receiving layer adjacent to such opening, and a sheet arranged in a series of folds having the folds longitudinally of the bandage and provided with a number of cell-spaces, such sheet being made of a coarser stock than the receiving layer, an open-mesh cover-sheet at the said opening and leaving a chamber-space between it and such receiving layer, and a perforated side-bracing and distributing member below such perforated receiving member.

Signed at Nos. 9 to 15 Murray street, New York, N. Y., this 11th day of June, 1904.

WILLARD R. GREEN.

Witnesses:
FRED. J. DOLE,
JOHN O. SEIFERT.